US012759211B2

(12) United States Patent
Hayashi et al.

(10) Patent No.: US 12,759,211 B2
(45) Date of Patent: Oct. 13, 2026

(54) MOLDING DEVICE

(71) Applicant: KYORAKU CO., LTD., Kyoto (JP)

(72) Inventors: Ryouta Hayashi, Nagoya (JP); Takurou Matsuda, Gifu (JP)

(73) Assignee: KYORAKU CO., LTD., Kyoto (JP)

( * ) Notice: Subject to any disclaimer, the term of this patent is extended or adjusted under 35 U.S.C. 154(b) by 58 days.

(21) Appl. No.: 18/859,296

(22) PCT Filed: May 18, 2023

(86) PCT No.: PCT/JP2023/018585
§ 371 (c)(1),
(2) Date: Oct. 23, 2024

(87) PCT Pub. No.: WO2023/228855
PCT Pub. Date: Nov. 30, 2023

(65) Prior Publication Data

US 2025/0312964 A1 Oct. 9, 2025

(30) Foreign Application Priority Data

May 23, 2022 (JP) ................................ 2022-084083

(51) Int. Cl.
*B29C 51/02* (2006.01)
*B29C 51/36* (2006.01)
*B29L 7/00* (2006.01)

(52) U.S. Cl.
CPC .............. *B29C 51/02* (2013.01); *B29C 51/36* (2013.01); *B29L 2007/002* (2013.01)

(58) Field of Classification Search
None
See application file for complete search history.

(56) References Cited

U.S. PATENT DOCUMENTS

2009/0174110 A1 7/2009 Yoshida et al.
2016/0200032 A1 * 7/2016 Nakajima ............... B29C 48/12 428/178
2017/0021077 A1 * 1/2017 Yamazaki ........... B29C 49/0208

FOREIGN PATENT DOCUMENTS

JP 2009160804 A 7/2009
JP 2014091329 A 5/2014

(Continued)

OTHER PUBLICATIONS

Yoshida JP2009160804 English Translation 2009 (Year: 2009).*

(Continued)

*Primary Examiner* — Jacob T Minskey
*Assistant Examiner* — Adrien J Bernard
(74) *Attorney, Agent, or Firm* — Maier & Maier, PLLC

(57) ABSTRACT

A molding device incudes a resin sheet forming device, a roller unit, a mold, and a static eliminator. The resin sheet forming device is configured to extrude a resin sheet in a molten state; the roller unit includes first and second rollers; the first and second rollers are configured to rotate in opposite directions while sandwiching the resin sheet so as to feed the resin sheet below the first and second rollers; the mold has a shaping surface to shape the resin sheet; and the static eliminator is configured to eliminate static from the resin sheet at a point after the resin sheet pass through the roller unit but before a bottom edge of the resin sheet reaches a lower end of a molding area of the mold.

7 Claims, 6 Drawing Sheets

(56) References Cited

FOREIGN PATENT DOCUMENTS

| | | | |
|---|---|---|---|
| JP | 2017030279 | A | 2/2017 |
| JP | 2019206162 | A | 12/2019 |

OTHER PUBLICATIONS

International Search Report issued on Jul. 11, 2023, in corresponding International Application No. PCT/JP2023/018585; 5 pages.

* cited by examiner

MOLDING DEVICE

TECHNICAL FIELD

The present invention relates to a molding device.

BACKGROUND

Patent Literature 1 discloses a method of manufacturing a molded body by sandwiching and feeding a resin sheet, extruded from a resin sheet forming device, with a pair of rollers and by shaping the resin sheet using a mold.

CITATION LIST

Patent Literature

[Patent Literature 1] Japanese Unexamined Application Publication No. 2019-206162

SUMMARY

The resin sheet is usually hung down so that it passes through a position several dozens of millimeters from the mold, but problems such as unintended wrinkles forming on the molded body may occur because of the resin sheet unintentionally coming too close to the mold.

The present invention has been made by taking these circumstances into consideration. The present invention provides a molding device that prevents the resin sheet from unintentionally approaching the mold.

According to the present invention, the following inventions are provided.

(1) A molding device comprising a resin sheet forming device, a roller unit, a mold, and a static eliminator, wherein: the resin sheet forming device is configured to extrude a resin sheet in a molten state; the roller unit comprises first and second rollers; the first and second rollers are configured to rotate in opposite directions while sandwiching the resin sheet so as to feed the resin sheet below the first and second rollers; the mold has a shaping surface to shape the resin sheet; and the static eliminator is configured to eliminate static from the resin sheet at a point after the resin sheet passes through the roller unit but before a bottom edge of the resin sheet reaches a lower end of a molding area of the mold.

(2) The molding device according to (1), wherein: the mold comprises a convex part in the molding area.

(3) The molding device according to (2), wherein: when total height of the molding area is H, a top of the convex part is located 0.3H or less from the lower end of the molding area.

(4) The molding device according to (3), wherein: an inclined surface is provided at an upper side of a top of the convex part; and the amount of protrusion of the inclined surface gradually decreases upward.

(5) The molding device according to any one of (2) to (4), comprising a mold frame arranged around the mold, wherein: the mold frame comprises a suctioning surface capable of suctioning the resin sheet, the mold frame is configured to advance toward the resin sheet to suction the resin sheet and then retract relative to the mold to press the resin sheet against the convex part.

(6) The molding device according to any one of (1) to (5), wherein: the roller unit comprises a frame that houses the first and second rollers, and the static eliminator is attached to underside of the frame directly or via other component.

The inventor investigated the cause of the resin sheet coming close to the mold and found that the resin sheet is charged when the resin sheet passes through the first and second rollers, and is attracted to the mold by electrostatic action. Based on this knowledge, they found that eliminating static from the resin sheet after it passes through the first and second rollers enables to prevent the resin sheet from unintentionally coming close to the mold, leading to the completion of this invention.

BRIEF DESCRIPTION OF DRAWINGS

FIG. 2A is a diagonal view from below, FIG. 2B is a bottom view, and FIG. 2C is a C-C cross section in FIG. 2B.

DETAILED DESCRIPTION

Hereinafter, embodiments of the present invention will be explained by using drawings. Various distinctive features shown in the following embodiments can be combined with each other. In addition, an invention can be established independently for each of the distinctive features.

1. The First Embodiment

1-1 Configuration of a Molding Device 100

Figure 1:
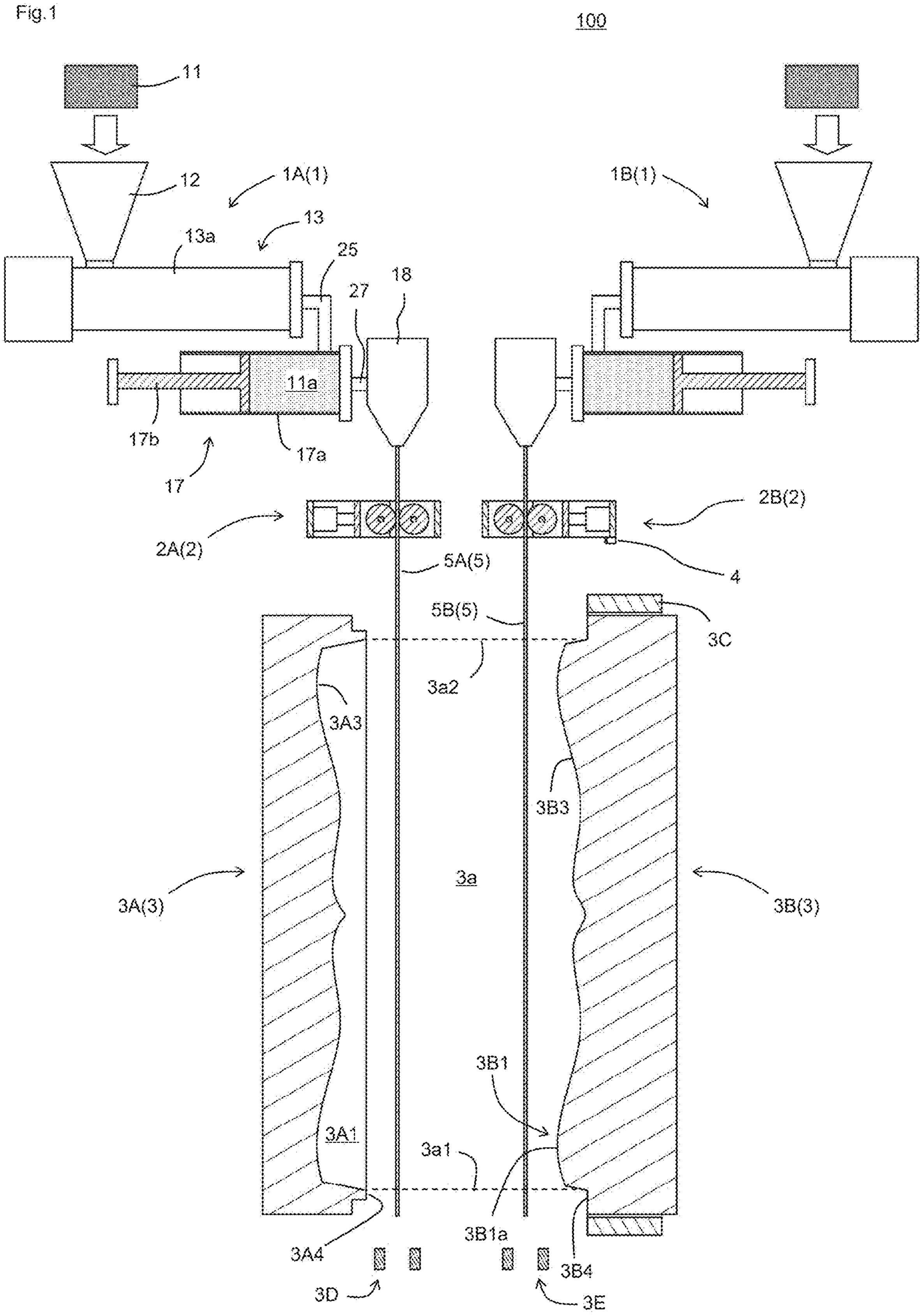
FIG. 1 shows a molding device of a first embodiment of the present invention.
Figure 2A:
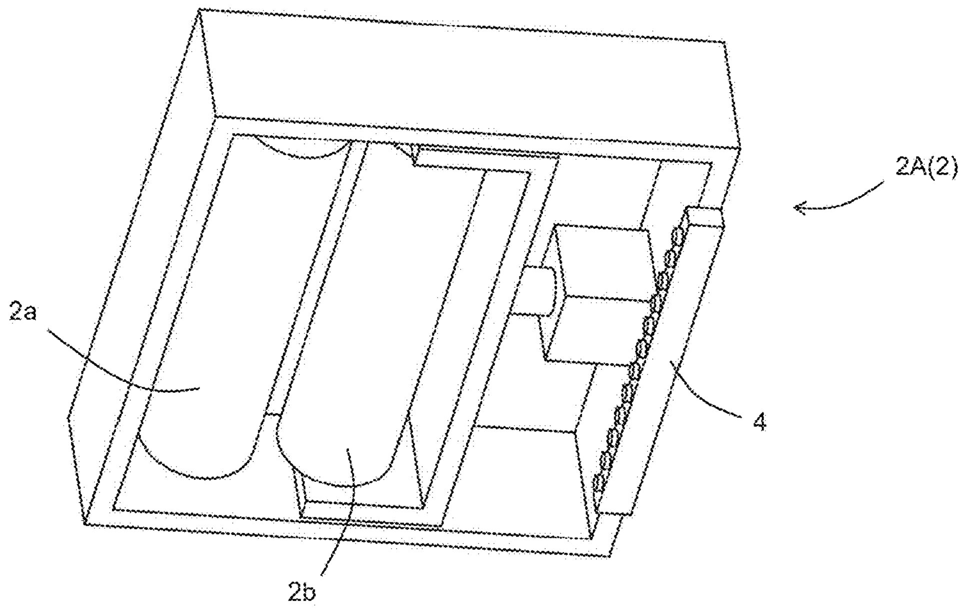
FIGS. 2A to 2C show a roller unit 2 and a static eliminator 4.
Figure 2B:
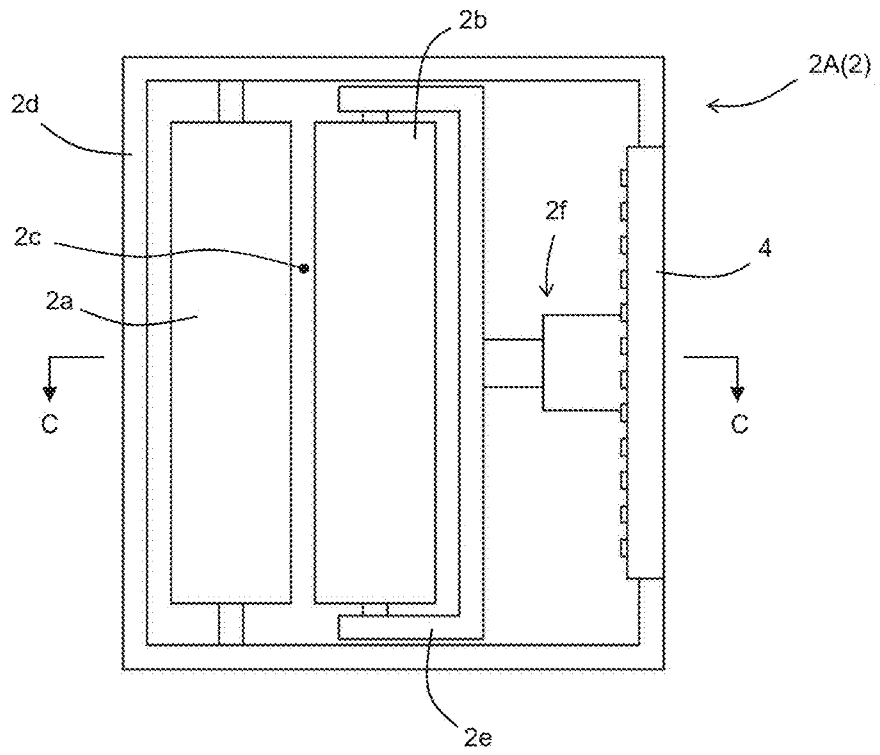
Figure 2C:
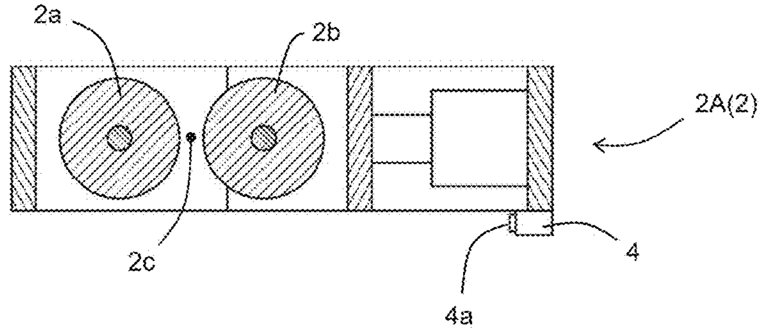
Figure 3:
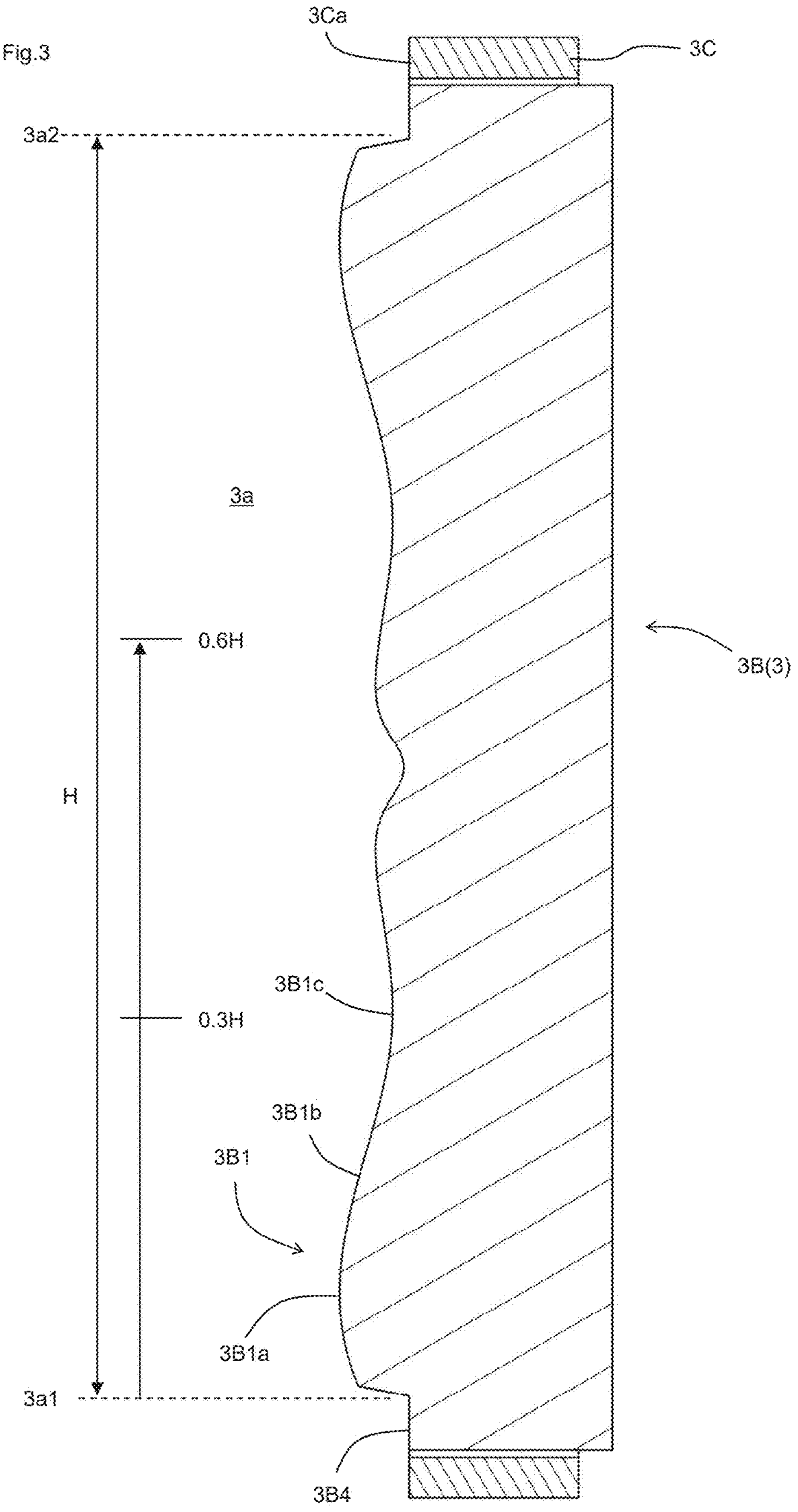
FIG. 3 is a cross-sectional view showing configurations of a mold 3B and a mold frame 3C.

As shown in FIG. 1, a molding device 100 of one embodiment of the invention comprises a pair of resin sheet forming devices 1, a pair of roller units 2, a mold unit 3, and a static eliminator 4. The pair of resin sheet forming devices 1 will be marked with subscripts A, B, as in 1A, 1B, when they need to be distinguished from each other. The same applies to the roller unit 2 and a resin sheet 5.

<Resin Sheet Forming Device 1>

The resin sheet forming device 1 is configured to extrude the resin sheet 5 in a molten state. The resin sheet forming device 1 comprises, in one example, a hopper 12, an extruder 13, an accumulator 17, and a T die 18. The extruder 13 and the accumulator 17 are connected via a connecting tube 25. The accumulator 17 and the T die 18 are connected via connecting a tube 27. The accumulator 17 can be omitted if it is not needed, in which case the molten resin extruded from the extruder 13 is directly injected into the T die 18.

The hopper 12 is used to feed raw resin 11 into a cylinder 13*a* of the extruder 13. The form of the raw resin 11 is not particularly limited, but is usually in the form of pellets. The raw resin is, for example, a thermoplastic resin such as polyolefin. Polyolefin includes low-density polyethylene, linear low-density polyethylene, high-density polyethylene, polypropylene, ethylene-propylene copolymers and blends thereof. The raw resin 11 is fed from the hopper 12 into the cylinder 13*a* and then heated in the cylinder 13*a* to melt it to be the molten resin. It is also conveyed toward the end of the cylinder 13*a* by the rotation of a screw positioned in the cylinder 13*a*. The screw is positioned inside the cylinder 13*a* and conveys the molten resin while kneading it by its rotation. The molten resin extruded from the resin extrusion port of the cylinder 13*a* is injected into the accumulator 17 through the connecting tube 25. The accumulator 17 comprises a cylinder 17*a* and a piston 17*b* that can slide inside the cylinder 17*a*, and the molten resin 11*a* can be stored in the cylinder 17*a*. After a predetermined amount of the molten resin 11*a* is stored in the cylinder 17*a*, the piston 17*b* is moved to extrude the molten resin 11*a* through the connecting tube 27 through a slit in the T die 18 and allow it to hang down to form the resin sheet 5 in a molten state.

<Roller Unit 2>

The roller unit 2 is located between the resin sheet forming device 1 and the mold unit 3. The roller unit 2 comprises first and second rollers 2*a* and 2*b*. The rollers 2*a* and 2*b* are configured to rotate in opposite directions while sandwiching the resin sheet 5 so as to feed the resin sheet 5 below the rollers 2*a* and 2*b*. Preferably, gap 2*c* between the rollers 2*a* and 2*b* is configured to be variable, so that the resin sheet 5 can be sandwiched by the rollers 2*a* and 2*b* by placing the resin sheet 5 between the rollers 2*a* and 2*b* with the gap 2*c* widened and then narrowing the gap 2*c*. The roller 2*a* is a fixed roller with a fixed position, and the roller 2*b* is a movable roller with a variable distance from the roller 2*a*.

The roller unit 2 comprises a frame 2*d*, a movable roller supporting part 2*e*, and a drive mechanism 2*f*. The frame 2*d* is open at the top and bottom so that the resin sheet 5 can pass through. The rollers 2*a* and 2*b* are arranged in the frame 2*d*. One of the rollers 2*a* and 2*b* is configured to be rotatably driven by a rotary drive mechanism (not shown) attached to the frame 2*d*. The rotation of one of the rollers 2*a* and 2*b* can be transmitted to the other of the rollers 2*a* and 2*b* via a gear mechanism (not shown) in the opposite direction of rotation. Thus, the rollers 2*a* and 2*b* can rotate synchronously in opposite directions and feed the resin sheet 5 downward. For example, when the rotary drive mechanism drives the roller 2*b*, the rotation applied to roller 2*b* is transmitted to the roller 2*a* via the gear mechanism.

The roller 2*b* is rotatably supported by the movable roller supporting part 2*e*, and the movable roller supporting part 2*e* is movable by the drive mechanism 2*f*. The drive mechanism 2*f* is configured with a cylinder mechanism or the like, and the size of the gap 2*c* can be changed by moving the movable roller supporting part 2*e*.

Rotating the rollers 2*a* and 2*b* in opposite directions while sandwiching the resin sheet 5 between the rollers 2*a* and 2*b* enables the resin sheet 5 to be fed below the rollers 2*a* and 2*b*. At this time, the resin sheet 5 is charged by friction between the resin sheet 5 and the rollers 2*a* and 2*b*. This charging is more pronounced when the humidity is low.

<Mold Unit 3>

The mold unit 3 comprises first and second molds 3A and 3B configured to be opened and closed. The molds 3A and 3B comprise shaping surfaces 3A3 and 3B3, respectively, to shape the resin sheet 5. The shaping surfaces 3A3 and 3B3 are provided in a molding area 3*a* to form a desired molded body. In this embodiment, the area surrounded by parting surfaces 3A4 and 3B4 is the molding area 3*a*.

More specifically, a first resin sheet 5A extruded from a first resin sheet forming device 1A and passing through a first roller unit 2A is hung down in a position adjacent to the mold 3A, and is vacuumed by the mold 3A under reduced pressure and shaped into a shape along the shaping surface 3A3. On the other hand, a second resin sheet 5B extruded from a second resin sheet forming device 1B and passing through a second roller unit 2B is hung down in a position adjacent to the mold 3B, and is vacuumed by the mold 3B under reduced pressure and shaped into a shape along the shaping surface 3B3.

When the molds 3A and 3B are then closed, the resin sheets 5A and 5B are welded together at the parting surfaces 3A4 and 3B4 of the molds 3A and 3B, and the desired molded body is formed in the molding area 3*a* which is the inside of an area surrounded by the parting surfaces 3A4 and 3B4.

The mold 3B has a convex part 3B1 and the mold 3A has a concave part 3A1 that can accommodate the convex part 3B1. In this embodiment, the convex part 3B1 is a portion protruding further than the parting surface 3B4.

Figure 5:
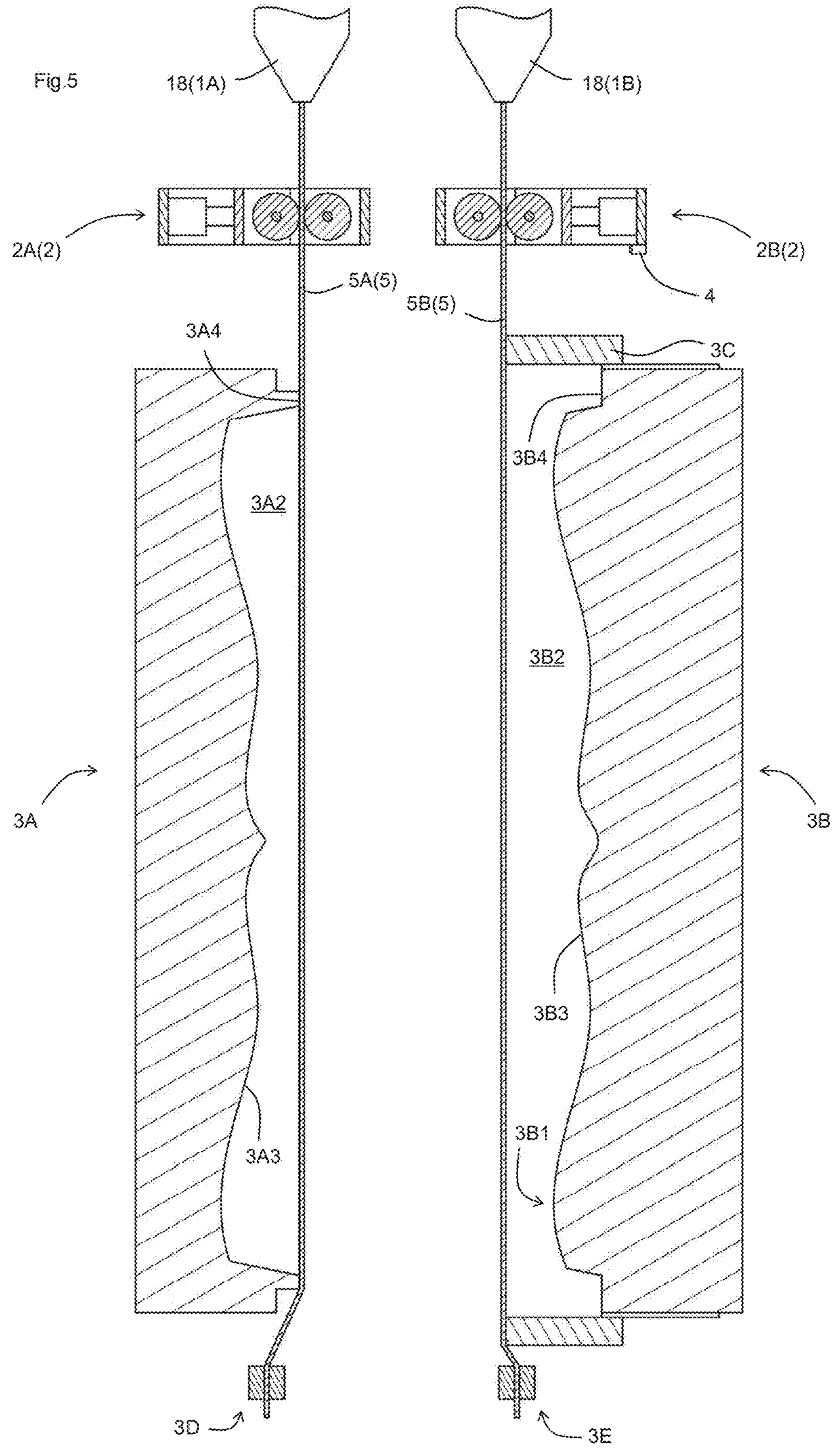
FIG. 5 shows a cross-sectional view after resin sheet 5A is brought into close contact with a mold 3A and resin sheet 5B is brought into close contact with a mold frame 3C from the state shown in FIG. 4.

The mold unit 3 comprises a mold frame 3C arranged around the mold 3B. The mold frame 3C comprises a suctioning surface 3Ca capable of suctioning the resin sheet 5B. The mold frame 3C is configured to advance toward the resin sheet 5B to suction the resin sheet 5B as shown in FIG. 5, and then retract relative to the mold 3B (i.e., the mold frame 3C retracts and/or the mold 3B advances) to press the resin sheet 5B against the convex part 3B1.

The mold unit 3 comprises first and second sheet holding parts 3D and 3E positioned below the molds 3A and 3B. After holding the resin sheets 5A and 5B, respectively, the sheet holding parts 3D and 3E press the resin sheets 5A and 5B against the molds 3A and 3B by moving in the respective opening directions of the molds 3A and 3B. As shown in FIG. 5, this forms sealed space 3A2 surrounded by the resin sheet 5A and the mold 3A, and sealed space 3B2 surrounded by the resin sheet 5B, the mold frame 3C, and the mold 3B, thereby improving the shapability of the molds 3A and 3B by vacuuming with reduced pressure.

By the way, the range within which the mold frame 3C can move is limited, and the resin sheet 5B need to hang down at a position that the mold frame 3C can reach. Therefore, it is usually difficult to make the gap between the resin sheet 5B and a top 3B1*a* of the convex part 3B1 excessively large, and this gap is usually set at 10 to 30 mm (preferably 15 to 25 mm).

Figure 6:
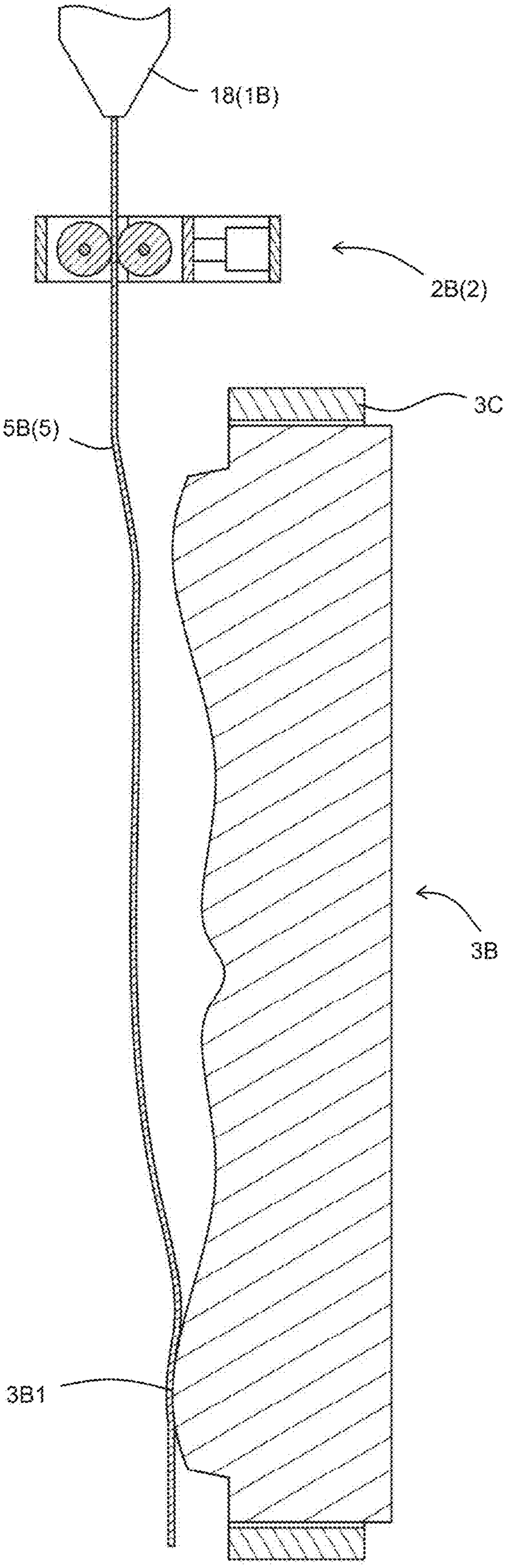
FIG. 6 is a schematic cross-sectional view of the hanging step shown in FIG. 4, in which the resin sheet 5B approaches the mold 3B and rides up on the convex part 3B1 when the static eliminator 4 is not present.

When the resin sheet 5B is not charged, the resin sheet 5B is not attracted to the mold 3B. However, when the resin sheet 5B is charged, the resin sheet 5B may be unintentionally attracted to the mold 3B by electrostatic force and ride up on the convex part 3B1, as shown in FIG. 6. When the resin sheet 5B rides up on the convex part 3B1, the slack of the resin sheet 5B increases, and as a result, folded walls may be generated in the resin sheet 5B where the inner surfaces stick to each other. The folded wall of the resin sheet 5B may not disappear even after shaping the resin sheet 5B, resulting in molding defects. To suppress the occurrence of such problems, In this embodiment, static is eliminated from the resin sheet 5B. The static eliminator 4 for eliminating static is described below.

The top 3B1*a* of the convex part 3B1 is preferably located at a height of 0.3H or less from a lower end 3*a*1 of the molding area 3*a*, where H is total height of the molding area 3*a*. When the top 3B1*a* is at a lower position, the length of the resin sheet 5B at the point where the resin sheet 5B has descended to a position opposite the top 3B1*a* is longer, and thus the resin sheet 5B is more likely to move and be attracted to the mold 3B by the electrostatic force. For this reason, the technical significance of applying the present invention is particularly significant when the top 3B1*a* is at the above position. The position of the top 3B1*a* may be, for example, 0.01H, 0.05H, 0.1H, 0.15H, 0.2H, 0.25H, 0.3H, and may be in the range between any two of the values illustrated here or below any of them.

It is preferred that an inclined surface 3B1*b* is provided at an upper side of the top 3B1*a* of the convex part 3B1, that the amount of protrusion of the inclined surface 3B1*b* gradually decreases upward. When the inclined surface 3B1*b* is provided at this portion, the resin sheet 5B can easily ride up on the convex part 3B1 when the resin sheet 5B is attracted to the mold 3B, and the technical significance of applying the present invention is particularly significant in such a case.

The location of a top edge 3B1*c* of the convex part 3B1 (e.g., the top edge 3B1*c* of the inclined surface 3B1*b* in this embodiment) is preferably located 0.6H or less from the lower end 3*a*1 of the molding area 3*a*. This is because in this case, the resin sheet 5B is particularly easy to ride up on the convex part 3B1. The position of the top edge 3B1*c* may be, for example, 0.1H, 0.2H, 0.3H, 0.4H, 0.5H, 0.6H, and may be in the range between any two of the values illustrated here or below any of them. The top edge 3B1*c* is the position where the protrusion of the convex part 3B1 ceases to change upward or becomes larger. There is no convex part 3B1 or another convex part 3B1 is provided at an upper side of the top edge 3B1*c*.

The convex part 3B1 has amount of protrusion relative to the parting surface 3B4 of, for example, 5 to 50 mm. This amount of protrusion is preferably between 5 and 20 mm, specifically, for example, 5, 10, 15, 20, 25, 30, 35, 40, 45, 50 mm, and may be in the range between any two of the values illustrated here.

When the amount of protrusion relative to the parting surface 3B4 at the top 3B1*a* is P1 and the amount of protrusion relative to the parting surface 3B4 at the top edge 3B1*c* is P2, P1 or (P1-P2) is preferably 5 to 50 mm, more preferably 5 to 20 mm, specifically, for example, 5 10, 15, 20, 25, 30, 35, 40, 45, 50 mm, and may be in the range between any two of the values illustrated here.

The mold 3B may have a plurality of convex parts 3B1, in which case at least one convex part 3B1 (e.g., the lowest convex part 3B1) should have the above configuration.

<Static Eliminator 4>

The static eliminator 4 is configured to eliminate static from the resin sheet 5B at a point after the resin sheet 5B pass through the roller unit 2B but before the bottom edge of the resin sheet 5B reaches the lower end 3A1 of the molding area 3*a*. This prevents the resin sheet 5B from being attracted to the mold 3B.

The timing at which the static eliminator 4 eliminates static is preferably at a point before the bottom edge of the resin sheet 5B reaches the top 3B1*a* of the lowest convex part 3B1, more preferably at a point before an upper end 3*a*2 of the molding area 3*a* is reached, and even more preferably immediately after the resin sheet 5B has passed the roller unit 2B. In this case, the resin sheet 5B is particularly restrained from being attracted to the mold 3B.

The static eliminator 4 can eliminate static from the resin sheet 5B by irradiating the resin sheet 5B with ions emitted from a ion emitter 4*a*. The irradiated ions have a charge opposite to the charge carried by the resin sheet 5B, and the charge of the resin sheet 5B is combined with the charge of the ions to eliminate static from the resin sheet 5B. For example, if the resin sheet 5B has a negative charge, it can be irradiated with positively charged ions. Although some static eliminators 4 irradiate the object with an air current of ions, it is preferable to operate the static eliminator 4 without an air current, because irradiating the resin sheet 5B with an air current may cause the resin sheet 5B to cool down and worsen its shapability. An example of the static eliminator 4 is the model SJ-H108A manufactured by Keyence Corporation.

The static eliminator 4 is preferably placed between the roller unit 2B and the mold unit 3, and is preferably attached to underside of the frame 2*d* of the roller unit 2B directly or via other component. In this case, the static eliminator 4 can be placed in a position where the resin sheet 5B can be eliminated static immediately after the resin sheet 5B passes through the roller unit 2B. The static eliminator 4 is preferably elongated and arranged so that the longitudinal direction of the static eliminator 4 is parallel to the longitudinal direction of the rollers 2*a* and 2*b*.

The length between the resin sheet 5B and the static eliminator 4 is, for example, 200 to 500 mm, specifically, for example, 200, 250, 300, 350, 400, 450, 500 mm, and may be in the range between any two of the values illustrated here.

In this embodiment, the static eliminator 4 is provided for static elimination only of the resin sheet 5B, but if necessary, another static eliminator 4 may be separately provided for static elimination of the resin sheet 5A.

1-2. Method of Manufacturing Molded Body

Next, the method of manufacturing the molded body using the molding device 100 will be described.

The method of manufacturing in this embodiment comprises a hanging step and a molding step. The following is a description of these steps.

(1) Hanging Step

Figure 4:
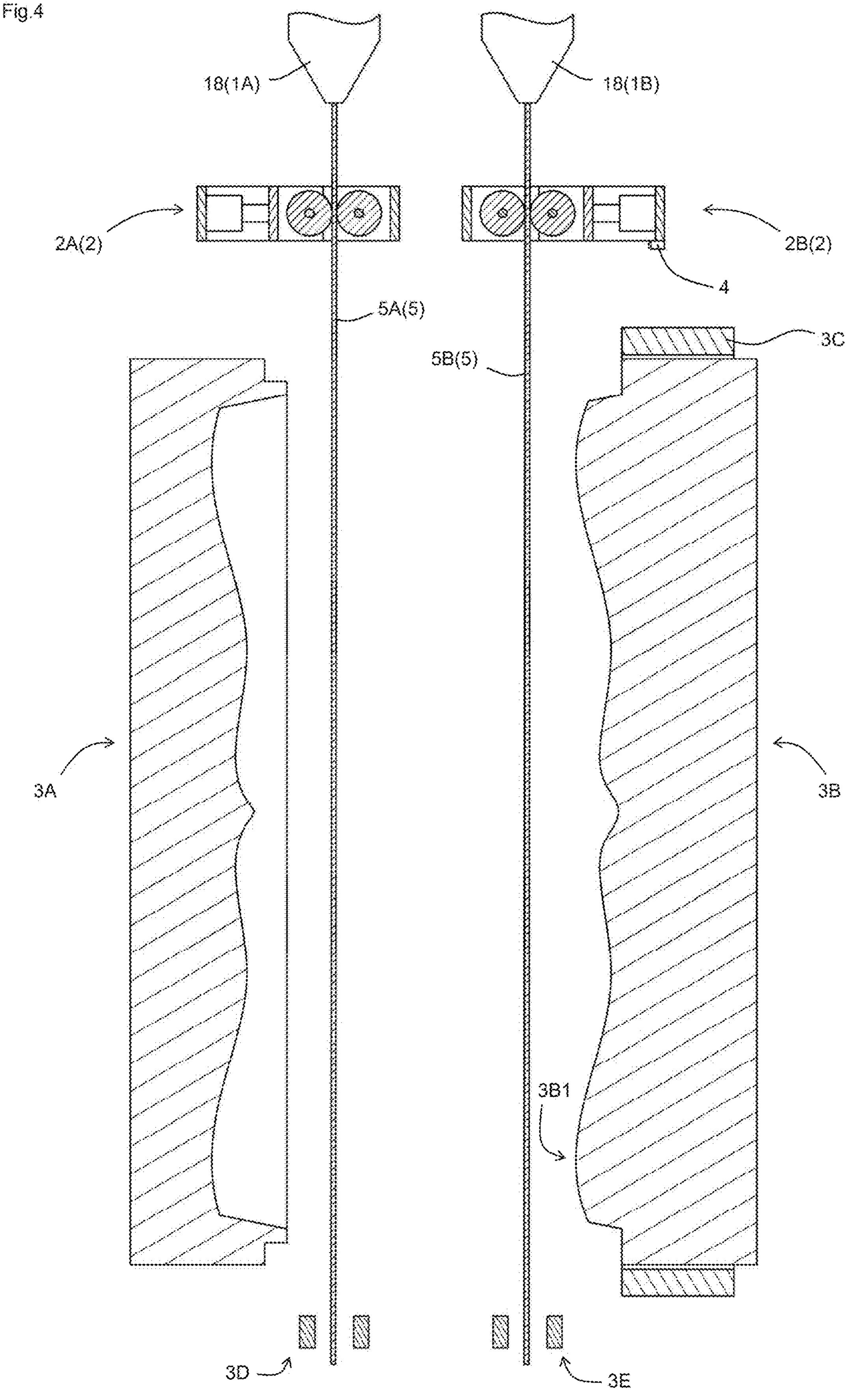
FIG. 4 shows a cross-sectional view of the state after the hanging step in the method of manufacturing a molded body.

In the hanging step, as shown in FIG. 4, the first resin sheet 5A extruded from the T die 18 of the first resin sheet forming device 1A and passed through the first roller unit 2A is hung down in a position adjacent to the mold 3A. The second resin sheet 5B extruded from the T die 18 of the second resin sheet forming device 1B and passed through the second roller unit 2B is hung down in a position adjacent to the mold 3B.

When the resin sheet 5B is charged, the resin sheet 5B may be attracted to the mold 3B (especially the convex part 3B1) and ride up on the convex part 3B1, as shown in FIG. 6, but in this embodiment, the static eliminator 4 eliminates static from the resin sheet 5B in the space between the roller unit 2B and the mold 3B, so the resin sheet 5B hangs down without being attracted to the mold 3B.

(2) Molding Step

In the molding step, as shown in FIG. 5, the mold 3A is brought closer to the resin sheet 5A and the holding part 3D is moved in the opening direction of the mold 3A (left direction in FIG. 5) with the resin sheet 5A held by the holding part 3D, so that the resin sheet 5A is brought into close contact with the parting surface 3A4 of the mold 3A. In addition, the mold frame 3C is brought closer to the resin sheet 5B, and the holding part 3E is moved in the opening direction of the mold 3B (right direction in FIG. 5) with the resin sheet 5B held by the holding part 3E, so that the resin sheet 5B is brought into close contact with the mold frame 3C. This forms the sealed space 3A2 surrounded by the resin sheet 5A and the mold 3A, and the sealed space 3B2 surrounded by the resin sheet 5B, the mold frame 3C, and the mold 3B.

Next, the resin sheet 5A is shaped into a shape along the shaping surface 3A3 of the mold 3A by vacuuming the resin sheet 5A with the mold 3A under reduced pressure. Also, by retracting the mold frame 3C relative to the mold 3B, the resin sheet 5B is pressed against the mold 3B (especially, the convex part 3B1), and the resin sheet 5B is shaped into a shape along the shaping surface 3B3 of the mold 3B by vacuuming the resin sheet 5B with the mold 3B under reduced pressure.

Next, when the molds 3A and 3B are closed, the resin sheets 5A and 5B are welded together at the parting surfaces 3A4 and 3B4 of the molds 3A and 3B, and the desired molded body is formed in the molding area 3*a* which is the inside of an area surrounded by the parting surfaces 3A4 and 3B4. Burrs are formed on the outside of the molding area 3*a*. The molds 3A and 3B are then opened to remove the molded body with burrs, and post-processing such as burr removal is performed to obtain the desired molded body. The molded body is a hollow molded body, but may also be a solid molded body. The molded body may be either a foamed or non-foamed molded body.

2. Other Embodiments

In the above embodiment, the molding device 100 is a device that molds using two resin sheets 5A and 5B, but the molding device 100 may also be a device that molds using one resin sheet 5. In this case, the molding device 100 needs to comprise with one resin sheet forming device 1 and one roller unit 2. Since the molds 3A and 3B can form the resin sheet 5 by sandwiching the resin sheet 5 between the molds 3A and 3B, the molds 3A and 3B do not need to vacuum the resin sheet 5 under reduced pressure.

In the above embodiment, the molding device 100 comprises the first and second molds 3A and 3B. Alternatively, the molding device 100 may comprise only the second mold 3B and enable molding of the resin sheet 5B by vacuum molding with reduced-pressure suction. In this case, the area where the shaping surface 3B3 to shape the desired molded body is provided is the molding area 3*a*, and the part surrounding the molding area 3*a* is the base part (corresponding to the parting surface 3B4). The convex part 3B1 is preferably a portion protruding more than the base portion, more preferably the most protruding portion in the second mold 3B. Even in such an embodiment, the static elimination of the resin sheet 5B by the static eliminator 4 prevents the resin sheet 5B from being attracted to the mold 3B. In this embodiment, the first "second" in the component name may be omitted because the resin sheet forming device, the roller unit, the resin sheet, the mold, and the sheet holding part are each single in this embodiment.

REFERENCE SIGN LIST

1: resin sheet forming device, 1A: first resin sheet forming device, 1B: second resin sheet forming device, 2: roller unit, 2A: first roller unit, 2B: second roller unit, 2*a*: first roller, 2*b*: second roller, 2*c*: gap, 2*d*: frame, 2*e*: movable roller supporting part, 2*f*: drive mechanism, 3: mold unit, 3A: first mold, 3A1: concave part, 3A2: sealed space, 3A3: shaping surface, 3A4: parting surface, 3B: second mold 3, 3B1: convex part, 3B1*a*: top, 3B1*b*: inclined surface, 3B1*c*: top edge, 3B2: sealed space, 3B3: shaping surface, 3B4: parting surface, 3C: mold frame, 3Ca: suctioning surface, 3D: first sheet holding part, 3E: second sheet holding part, 3*a*: molding area, 3*a*1: lower end, 3*a*2: upper end, 4: static eliminator, 4*a*: ion emitter, 5: resin sheet, 5A: first resin sheet, 5B: second resin sheet, 11: raw resin, 11*a*: molten resin, 12: hopper, 13: extruder, 13*a*: cylinder, 17 accumulator, 17*a*: cylinder, 17*b*: piston, 18: T die, 25: connecting tube, 27: connecting tube, 100: molding device.

The invention claimed is:

1. A molding device comprising a resin sheet forming device, a roller unit, a mold, and a static eliminator, wherein:

the resin sheet forming device is configured to extrude a resin sheet in a molten state;

the roller unit comprises first and second rollers;

the first and second rollers are configured to rotate in opposite directions while sandwiching the resin sheet so as to feed the resin sheet below the first and second rollers;

the mold has a shaping surface to shape the resin sheet; and the static eliminator is disposed between the roller unit and the mold, and is configured to eliminate static from the resin sheet at a point after the resin sheet passes through the roller unit but before a bottom edge of the resin sheet reaches a lower end of a molding area of the mold.

2. The molding device according to claim 1, wherein:

the mold comprises a convex part in the molding area.

3. The molding device according to claim 2, wherein:

a top of the convex part is located at a height of 0.3H or less from the lower end of the molding area, where His total height of the molding area.

4. The molding device according to claim 3, wherein:

an inclined surface is provided at an upper side of the top of the convex part; and the amount of protrusion of the inclined surface gradually decreases upward.

5. The molding device according to claim 2, comprising a mold frame arranged around the mold, wherein:

the mold frame comprises a suctioning surface capable of suctioning the resin sheet, the mold frame is configured to advance toward the resin sheet to suction the resin sheet and then retract relative to the mold to press the resin sheet against the convex part.

6. The molding device according to claim 1, wherein:

the roller unit comprises a frame that houses the first and second rollers, and the static eliminator is attached to underside of the frame directly or via other component.

7. The molding device according to claim 1, wherein the static eliminator is configured to operate without an air current.

* * * * *